United States Patent
Takaoka

(10) Patent No.: US 8,358,684 B2
(45) Date of Patent: Jan. 22, 2013

(54) DEMODULATION CIRCUIT, DEMODULATION METHOD, PROGRAM, AND RECEPTION APPARATUS

(75) Inventor: Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 980 days.

(21) Appl. No.: 12/406,479

(22) Filed: Mar. 18, 2009

(65) Prior Publication Data

US 2009/0268800 A1     Oct. 29, 2009

(30) Foreign Application Priority Data

Apr. 23, 2008 (JP) ................. 2008-112969

(51) Int. Cl.
*H03H 7/30* (2006.01)
*H03K 5/159* (2006.01)
(52) U.S. Cl. ......... 375/232; 375/231; 375/324; 375/343
(58) Field of Classification Search .................. 375/232, 375/233, 316, 340
See application file for complete search history.

(56) References Cited

U.S. PATENT DOCUMENTS

| 5,526,378 | A | * | 6/1996 | Knutson et al. | ............... | 375/229 |
| 5,712,873 | A | * | 1/1998 | Shiue et al. | ............... | 375/233 |
| 2005/0254568 | A1 | | 11/2005 | Markman et al. | | |
| 2006/0291553 | A1 | | 12/2006 | Nemer | | |

FOREIGN PATENT DOCUMENTS

| JP | 07-095136 | 4/1995 |
| JP | 2002-033682 | 1/2002 |
| JP | 2005-523635 | 8/2005 |
| JP | 2006-074314 | 3/2006 |
| JP | 2008-544709 | 12/2008 |

OTHER PUBLICATIONS

Japanese Patent Office Action corresponding to Japanese Serial No. 2008-112969 dated Mar. 4, 2010.

* cited by examiner

*Primary Examiner* — David Ometz
*Assistant Examiner* — Qutbuddin Ghulamali
(74) *Attorney, Agent, or Firm* — SNR Denton US LLP

(57) ABSTRACT

A demodulation circuit including: a first error calculation section configured to calculate a first error in accordance with a blind method; a second error calculation section configured to calculate a second error in accordance with a DD method; an update section configured to update filter coefficients for first and second filters based on the first or second error, the first filter filtering an input signal to generate a first signal, the second filter filtering a signal representing a hard decision value for a post-equalization signal to generate a second signal; a control section configured to, in the case where the update section is updating the filter coefficients based on the second error, controlling the filter coefficients to be updated based on the first error, when the degree of the second error has exceeded a first threshold; and a generation section configured to generate the post-equalization signal based on the first and second signals.

9 Claims, 13 Drawing Sheets

DEMODULATION CIRCUIT, DEMODULATION METHOD, PROGRAM, AND RECEPTION APPARATUS

BACKGROUND OF THE INVENTION

1. Field of the Invention

The present invention relates to a demodulation circuit, a demodulation method, a program, and a reception apparatus. In particular, the present invention relates to a demodulation circuit, a demodulation method, a program, and a reception apparatus which make it possible to stabilize an operation of an equalizer even when there are variations in a channel.

2. Description of the Related Art

In terrestrial digital broadcasting, the amplitude and phase of a signal may differ between transmission and reception due to influence of multipath and so on during transmission. Therefore, a receiver needs to perform equalization on the signal at the time of demodulation, so that the signal received will be identical in amplitude and phase to the signal transmitted.

FIG. 1 illustrates an exemplary structure of an equalizer 1 provided in a known digital demodulation apparatus (a demodulation circuit).

As illustrated in FIG. 1, the equalizer 1, which is formed by a decision feedback equalizer (DFE), i.e., one method of constructing an equalizer, includes a feed forward equalizer (FFE) 11 and a feed back equalizer (FBE) 14. A signal that is outputted from a unit that performs a synchronization process and provided in a stage previous to the equalizer 1 is inputted to the FFE 11.

The FFE 11 is composed of a finite impulse response (FIR) filter and so on. The FFE 11 subjects the input signal into filtering based on a filter coefficient set by a coefficient update section 16. The resulting signal, obtained from the filtering by the FFE 11, is inputted to an adding circuit 12.

The adding circuit 12 adds the signal supplied from the FFE 11 to a signal supplied from the FBE 14, and outputs the resulting signal as a post-equalization signal. The post-equalization signal outputted from the adding circuit 12 is supplied to an error correction processor or the like that is provided in a stage subsequent to the equalizer 1, and is also inputted to a slicer 13, a blind error calculation section 21, and a decision-directed (DD) error calculation section 22.

The slicer 13 calculates a hard decision value for the post-equalization signal supplied from the adding circuit 12. In the slicer 13, based on a value, e.g., 1.5, which is represented by the post-equalization signal, the hard decision value, e.g., 1, which is close to that value, is obtained. A signal representing the hard decision value obtained by the slicer 13 is inputted to the FBE 14 and the DD error calculation section 22.

The FBE 14 is also composed of the FIR filter and so on, and subjects the signal representing the hard decision value obtained by the slicer 13 to filtering based on a filter coefficient set by the coefficient update section 16. The resulting signal, obtained from the filtering by the FBE 14, is inputted to the adding circuit 12, and used, in combination with the signal outputted from the FFE 11, to generate the post-equalization signal.

An error calculation block 15 includes the blind error calculation section 21, the DD error calculation section 22, and a selector 23.

The blind error calculation section 21 calculates an error in the post-equalization signal supplied from the adding circuit 12 in accordance with a blind method. Here, equalization that is performed while updating the filter coefficients in such a direction that the error calculated in accordance with the blind method will decrease is referred to as blind equalization. The blind equalization makes it possible to reproduce a transmitted signal by estimating an inverse characteristic of a channel based on a received signal, while characteristics of the channel and input are unknown. In the blind error calculation section 21, the error is calculated based on an equation defined by a modulation scheme and the value represented by the post-equalization signal supplied from the adding circuit 12. A signal that represents the error (i.e., a blind error) calculated by the blind error calculation section 21 is inputted to the selector 23.

The DD error calculation section 22 calculates an error in the post-equalization signal in accordance with a DD method, based on the post-equalization signal supplied from the adding circuit 12 and the signal representing the hard decision value supplied from the slicer 13. In the case where the value represented by the post-equalization signal supplied from the adding circuit 12 is 1.5 as described above, and the hard decision value represented by the signal supplied from the slicer 13 is 1, for example, the DD error calculation section 22 obtains a difference between the two values, 0.5, as the error in the post-equalization signal. A signal that represents the error (i.e., a DD error) calculated by the DD error calculation section 22 is inputted to the selector 23.

The selector 23 selects one of the signal representing the blind error supplied from the blind error calculation section 21 and the signal representing the DD error supplied from the DD error calculation section 22, and outputs the selected signal to the coefficient update section 16.

The coefficient update section 16 updates the filter coefficient for the FFE 11 and the filter coefficient for the FBE 14, based on the error represented by the signal supplied from the selector 23. The coefficient update section 16 updates the filter coefficients in such a direction that the error in the post-equalization signal will decrease.

Japanese Patent Laid-open No. 2002-33682 discloses a technique of estimating an equalizer output based on a minimum entropy method and adjusting an equalizer parameter in such a manner as to optimize the equalizer output.

SUMMARY OF THE INVENTION

Immediately after start of demodulation, the equalizer 1 is not converged, and the filter coefficients do not have optimum values.

Accordingly, in general, the blind equalization, which updates the filter coefficients based on the blind error, is applied immediately after the start of the demodulation, while DD error-based equalization that updates the filter coefficients based on the DD error is applied when the equalizer 1 has been converged to a sufficient degree.

The blind equalization is inferior to the DD error-based equalization in terms of required carrier to noise (C/N). Therefore, the blind equalization is replaced with the DD error-based equalization when the equalizer 1 has been converged to a sufficient degree. For example, the selector 23 is supplied beforehand with a period of time that is considered to pass from the start of the demodulation until the equalizer 1 is converged to a sufficient degree owing to the blind equalization, for example. The output from the selector 23 is switched such that the signal representing the blind error calculated by the blind error calculation section 21 continues to be outputted until the period of time with which the selector 23 is supplied beforehand elapses from the start of the demodulation, and that the signal representing the DD error calculated by the DD error calculation section 22 is outputted after that period of time has elapsed.

In the case where the channel involves only slight variations, the DD error-based equalization can be applied continuously without a problem after the equalizer 1 is once converged. On the other hand, in the case where the channel involves too significant variations, the update of the filter coefficients cannot follow the variations in the channel, resulting in output of an erroneous hard decision value from the slicer 13. As a result, the DD error will be calculated using the erroneous hard decision value, and the filter coefficients will be continuously updated based on inaccurate DD errors, resulting in divergence of the equalizer 1.

The present invention addresses the above-identified, and other problems associated with existing methods and apparatuses, and aims to make it possible to stabilize the operation of the equalizer even when there are variations in the channel.

According to an embodiment of the present invention, there is provided a demodulation circuit including: a first error calculation section configured to calculate a first error in a post-equalization signal in accordance with a blind method; a second error calculation section configured to calculate a second error in the post-equalization signal in accordance with a DD method; an update section configured to update a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal; a control section configured to, in a case where the update section is performing the update of the filter coefficients for the first and second filters based on the second error, controlling the update of the filter coefficients for the first and second filters to be performed based on the first error, when a degree of the second error has exceeded a first threshold; and a generation section configured to generate the post-equalization signal based on the first and second signals.

According to another embodiment of the present invention, there is provided a demodulation method including the steps of: calculating a first error in a post-equalization signal in accordance with a blind method; calculating a second error in the post-equalization signal in accordance with a DD method; updating a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal; in a case where the update of the filter coefficients for the first and second filters is being performed based on the second error, updating the filter coefficients for the first and second filters based on the first error, when a degree of the second error has exceeded a threshold; and generating the post-equalization signal based on the first and second signals.

According to yet another embodiment of the present invention, there is provided a program for causing a computer to perform a process including the steps of: calculating a first error in a post-equalization signal in accordance with a blind method; calculating a second error in the post-equalization signal in accordance with a DD method; updating a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal; in a case where the update of the filter coefficients for the first and second filters is being performed based on the second error, updating the filter coefficients for the first and second filters based on the first error, when a degree of the second error has exceeded a threshold; and generating the post-equalization signal based on the first and second signals.

According to yet another embodiment of the present invention, there is provided a reception apparatus including: a first error calculation section configured to calculate a first error in a post-equalization signal in accordance with a blind method; a second error calculation configured to calculate a second error in the post-equalization signal in accordance with a DD method; an update section configured to update a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal; a control section configured to, in a case where the update section is performing the update of the filter coefficients for the first and second filters based on the second error, controlling the update of the filter coefficients for the first and second filters to be performed based on the first error, when a degree of the second error has exceeded a threshold; and a generation section configured to generate the post-equalization signal based on the first and second signals.

According to an embodiment of the present invention, a first error in a post-equalization signal is calculated in accordance with a blind method, and a second error in the post-equalization signal is calculated in accordance with a DD method. In addition, a filter coefficient for a first filter, which subjects an input signal to filtering to generate a first signal that is used to generate the post-equalization signal, and a filter coefficient for a second filter, which subjects a signal representing a hard decision value for the post-equalization signal to filtering to generate a second signal that is used to generate the post-equalization signal, are updated based on the first or second error. In the case where the update of the filter coefficients for the first and second filters is being performed based on the second error, the filter coefficients for the first and second filters are updated based on the first error, when the degree of the second error has exceeded a threshold. The post-equalization signal is generated based on the first and second signals.

According an embodiment of the present invention, it is possible to stabilize the operation of an equalizer even when there are variations in a channel.

DETAILED DESCRIPTION OF THE PREFERRED EMBODIMENT

Figure 2:
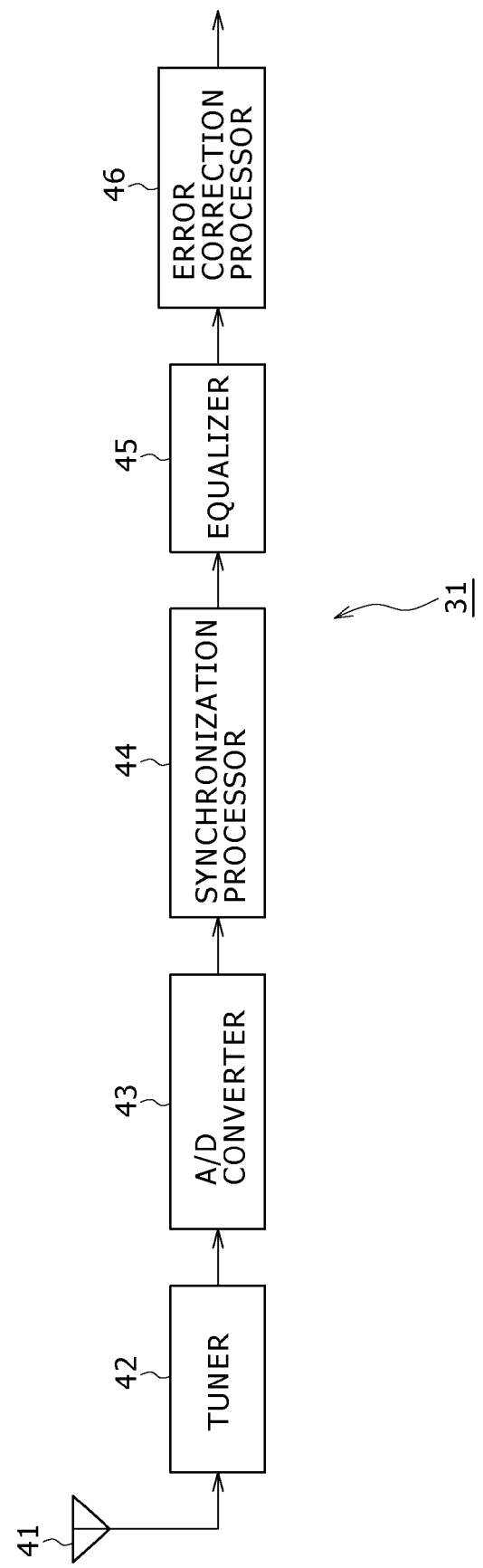
FIG. 2 is a block diagram illustrating an exemplary structure of a part of a reception apparatus according to an embodiment of the present invention.

FIG. 2 is a block diagram illustrating an exemplary structure of a part of a reception apparatus 31 according to an embodiment of the present invention.

As illustrated in FIG. 2, the reception apparatus 31 includes a tuner 42, an analog to digital converter 43, a synchronization processor 44, an equalizer 45, and an error correction processor 46. Of these components, at least the equalizer 45 is contained inside the reception apparatus 31 in the form of a large scale integrated circuit (LSI) as a demodulation circuit.

The tuner 42 frequency-converts an RF signal received by a receiving antenna 41 into an IF signal, and outputs the IF signal to the analog to digital converter 43.

The analog to digital converter 43 subjects the IF signal supplied from the tuner 42 to analog to digital conversion, and outputs the resulting digital IF signal to the synchronization processor 44.

The synchronization processor 44 subjects the IF signal supplied from the analog to digital converter 43 to a synchronization process, and outputs the resulting signal to the equalizer 45.

The equalizer 45 removes, from the signal supplied from the synchronization processor 44, distortion components introduced owing to the transmission channel, and outputs the resulting signal, i.e., a post-equalization signal, to the error correction processor 46.

The error correction processor 46 subjects the post-equalization signal supplied from the equalizer 45 to an error correction process, and outputs the resulting data, obtained from the error correction process, to a circuit in a subsequent stage as decoded data.

Figure 3:
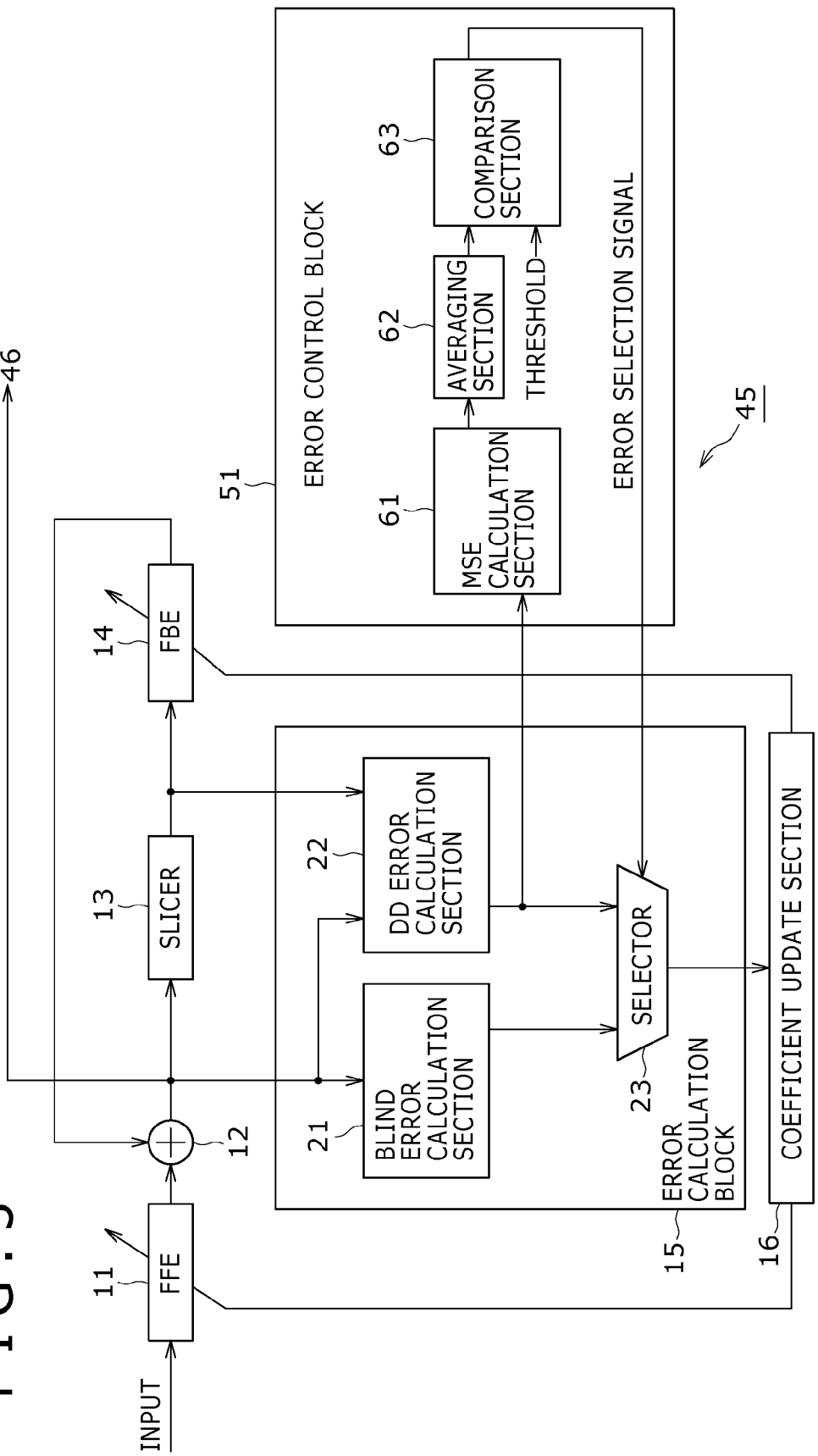
FIG. 3 illustrates an exemplary structure of an equalizer as illustrated in FIG. 2.

FIG. 3 illustrates an exemplary structure of the equalizer 45 as illustrated in FIG. 2.

Figure 1:
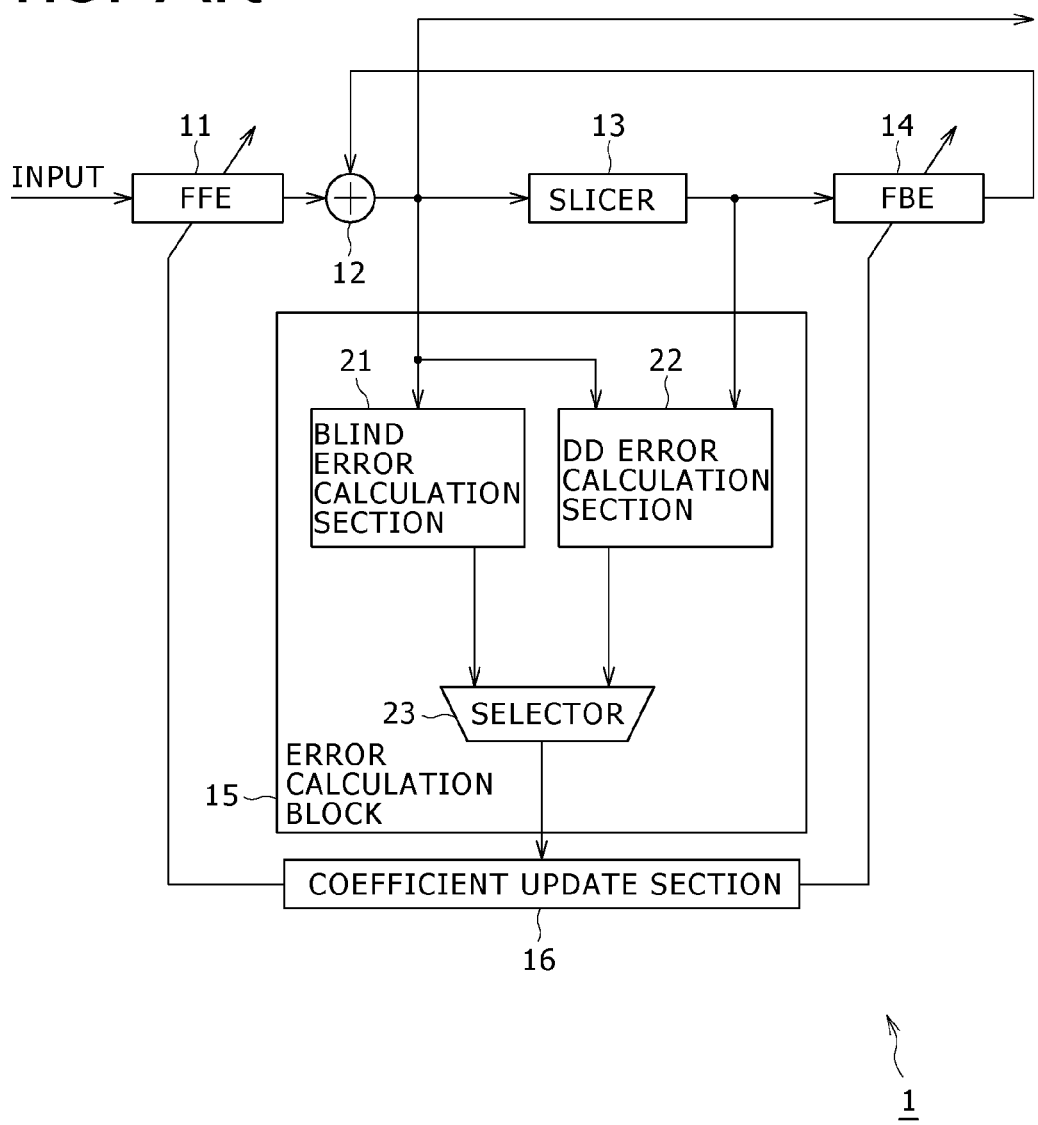
FIG. 1 illustrates an exemplary structure of a known equalizer.

In FIG. 3, components that have equivalent components in FIG. 1 are assigned the same reference numerals as their equivalent components in FIG. 1. As illustrated in FIG. 3, the equalizer 45 is different from the equalizer 1 as illustrated in FIG. 1 in that the equalizer 45 additionally includes an error control block 51. A signal that is outputted from the synchronization processor 44 in a stage previous to the equalizer 45 is inputted to an FFE 11.

The FFE 11 as a first filter is formed by an FIR filter and so on, and subjects the input signal to filtering based on a filter coefficient set by a coefficient update section 16. The resulting signal, obtained from the filtering by the FFE 11, is inputted to an adding circuit 12.

The adding circuit 12 adds the signal supplied from the FFE 11 to a signal supplied from an FBE 14, and outputs the resulting signal as the post-equalization signal. The post-equalization signal outputted from the adding circuit 12 is supplied to the error correction processor 46, and is also inputted to a slicer 13, a blind error calculation section 21, and a DD error calculation section 22.

The slicer 13 calculates a hard decision value for the post-equalization signal supplied from the adding circuit 12. A signal representing the hard decision value calculated by the slicer 13 is inputted to the FBE 14 and the DD error calculation section 22.

The FBE 14 as a second filter is formed by the FIR filter and so on, and subjects the signal representing the hard decision value calculated by the slicer 13 to filtering based on a filter coefficient set by the coefficient update section 16. The resulting signal, obtained from the filtering by the FBE 14, is inputted to the adding circuit 12, and used, in combination with the signal outputted from the FFE 11, to generate the post-equalization signal.

An error calculation block 15 includes the blind error calculation section 21, the DD error calculation section 22, and a selector 23.

The blind error calculation section 21 calculates an error in the post-equalization signal supplied from the adding circuit 12 in accordance with a blind method. In the blind error calculation section 21, the error is calculated based on an equation defined by a modulation scheme and the value represented by the post-equalization signal supplied from the adding circuit 12. A signal that represents the blind error (i.e., a first error) calculated by the blind error calculation section 21 is inputted to the selector 23. Constant modulus algorithm (CMA), Sato, Stop & Go, and other algorithms may be applied to calculate the blind error.

The DD error calculation section 22 calculates the error in the post-equalization signal in accordance with a DD method, based on the post-equalization signal supplied from the adding circuit 12 and the signal supplied from the slicer 13. A signal representing the DD error (i.e., a second error) calculated by the DD error calculation section 22 is inputted to the selector 23 and a mean square error (MSE) calculation section 61 in the error control block 51.

The selector 23 outputs, to the coefficient update section 16, one of the signal representing the blind error supplied from the blind error calculation section 21 and the signal representing the DD error supplied from the DD error calculation section 22. An error selection signal outputted from a comparison section 63 in the error control block 51 is also inputted to the selector 23.

For example, the selector 23 continues to output the signal representing the blind error calculated by the blind error calculation section 21 until a predetermined period of time passes from start of demodulation, and then starts outputting the signal representing the DD error calculated by the DD error calculation section 22 when that period of time has elapsed. The selector 23 is supplied beforehand with the period of time that is considered to pass from the start of the demodulation until an operation of the equalizer 45 is converged to a sufficient degree owing to the blind equalization.

After the predetermined period of time has elapsed since the start of the demodulation, the selector 23 switches its output in accordance with the error selection signal supplied from the comparison section 63.

The coefficient update section 16 updates the filter coefficient for the FFE 11 and the filter coefficient for the FBE 14, based on the error represented by the signal supplied from the selector 23. The coefficient update section 16 updates the filter coefficients in such a direction that the error in the post-equalization signal will decrease.

The error control block 51 includes the mean square error (MSE) calculation section 61, an averaging section 62, and the comparison section 63.

The MSE calculation section 61 calculates the square (MSE) of the DD error calculated by the DD error calculation section 22, and outputs a signal representing the calculated MSE to the averaging section 62.

The averaging section 62 calculates, for every predetermined period of time, an average value of the MSE calculated by the MSE calculation section 61, and outputs a signal representing the resulting averaged MSE to the comparison section 63.

The comparison section 63 compares the averaged MSE calculated by the averaging section 62 with a predetermined threshold, with which the comparison section 63 is supplied beforehand. In the case where the averaged MSE is equal to or greater than the threshold, if the equalization method applied at the time is the DD error-based equalization, the comparison section 63 outputs to the selector 23 an error selection signal for issuing an instruction to output the signal representing the blind error in place of the signal representing the DD error. This allows the equalization method to be switched from the DD error-based equalization to the blind equalization when the equalizer 45 is about to diverge due to a significant increase in the DD error. The threshold prepared is, for example, a value representing an averaged MSE corresponding to a DD error immediately before the equalizer 45 would diverge.

Meanwhile, in the case where the averaged MSE is lower than the threshold, the comparison section 63 outputs to the selector 23 an error selection signal for issuing an instruction to output the signal representing the DD error again.

Figure 4:
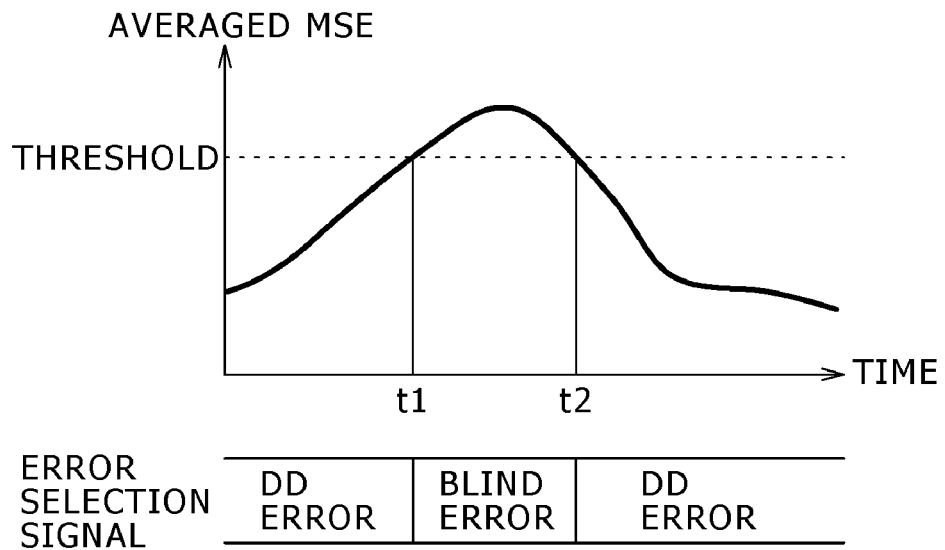
FIG. 4 illustrates an example of switch in error selection signal.

FIG. 4 illustrates an example of switch in the error selection signal.

A vertical axis of a graph shown in an upper part of FIG. 4 represents the averaged MSE, whereas a horizontal axis of the graph represents time. A dotted line represents the threshold with which the comparison section 63 is supplied. A waveform represents changes in the averaged MSE after the DD error-based equalization is started as a result of the elapse of the predetermined period of time since the start of the demodulation.

In the example of FIG. 4, the error selection signal for issuing the instruction to select the DD error continues to be outputted from the comparison section 63 to the selector 23 until time t1, when the averaged MSE reaches and exceeds the threshold. From time t1 until time t2, when the averaged MSE becomes lower than the threshold, the error selection signal for issuing the instruction to select the blind error continues to be outputted from the comparison section 63 to the selector 23. After time t2, the averaged MSE is lower than the threshold, and accordingly the error selection signal for issuing the instruction to select the DD error continues to be outputted from the comparison section 63 to the selector 23.

Procedures performed in the equalizer 45 with the above-described structure will now be described below. Processes of steps in flowcharts as described below may be performed in numerical order. Some of the processes may be performed in parallel with the processes of other steps as appropriate.

First, an equalization process performed by the equalizer 45 will now be described below with reference to a flowchart of FIG. 5.

At step S1, the FFE 11 subjects the input signal to the filtering based on the filter coefficient set by the coefficient update section 16. The resulting signal, obtained from the filtering by the FFE 11, is inputted to the adding circuit 12.

At step S2, the adding circuit 12 adds the signal supplied from the FFE 11 to the signal supplied from the FBE 14, and outputs the resulting post-equalization signal. The post-equalization signal outputted from the adding circuit 12 is inputted to the slicer 13, the blind error calculation section 21, and the DD error calculation section 22.

At step S3, the slicer 13 calculates the hard decision value for the post-equalization signal supplied from the adding circuit 12. The signal representing the hard decision value calculated by the slicer 13 is inputted to the FBE 14 and the DD error calculation section 22.

At step S4, the FBE 14 subjects the signal representing the hard decision value calculated by the slicer 13 to the filtering. The resulting signal, obtained from the filtering by the FBE 14, is inputted to the adding circuit 12, and used, in combination with the signal outputted from the FFE 11, to generate the post-equalization signal.

At step S5, the error calculation block 15 calculates the blind error in the blind error calculation section 21, and calculates the DD error in the DD error calculation section 22. One of the blind error calculated by the blind error calculation section 21 and the DD error calculated by the DD error calculation section 22 is used to update the filter coefficients. The DD error calculated by the DD error calculation section 22 is supplied to the MSE calculation section 61 as well. Thereafter, control returns to step S1, and the above-described processes are repeated.

Figure 6:
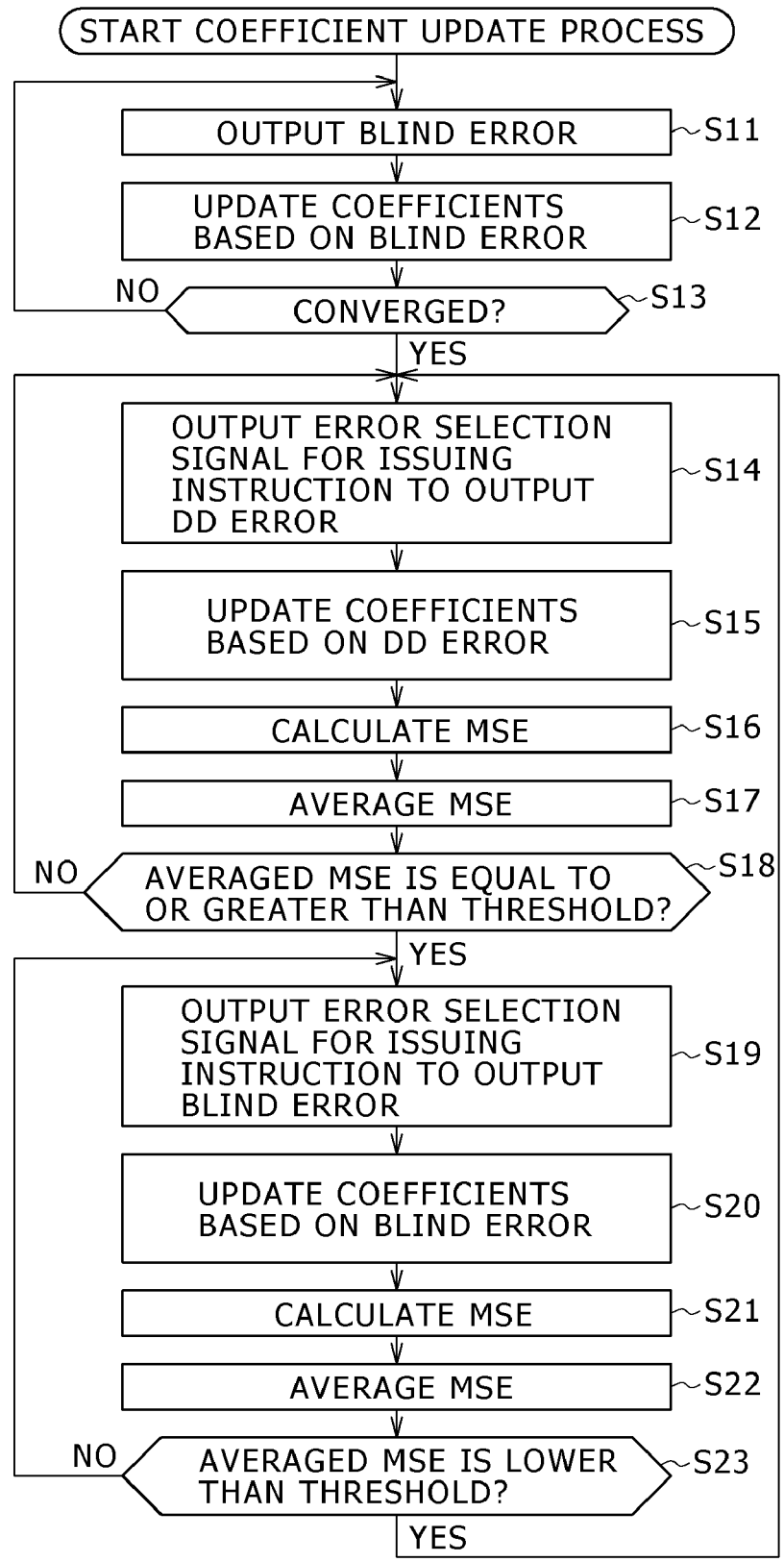
FIG. 6 is a flowchart illustrating a procedure for updating filter coefficients in the equalizer.

Next, a procedure performed by the equalizer 45 when updating the filter coefficients will now be described below with reference to a flowchart of FIG. 6. This procedure is started when the demodulation has been started in the reception apparatus 31.

At step S11, the selector 23 outputs the signal representing the blind error supplied from the blind error calculation section 21. More specifically, in the process of step S5 in FIG. 5, the signal representing the blind error calculated by the blind error calculation section 21 and the signal representing the DD error calculated by the DD error calculation section 22 are supplied to the selector 23, and of the two signals, the signal representing the blind error is outputted from the selector 23.

At step S12, the coefficient update section 16 updates the filter coefficient for the FFE 11 and the filter coefficient for the FBE 14 based on the blind error represented by the signal supplied from the selector 23, to perform the blind equalization.

At step S13, the selector 23 determines whether or not the operation of the equalizer 45 has been converged as a result of the blind equalization, i.e., whether or not the predetermined period of time previously supplied has elapsed. If it is determined at step S13 that the operation of the equalizer 45 has not been converged, the processes of steps S11 to S13 are repeated.

Meanwhile, if it is determined at step S13 that the operation of the equalizer 45 has been converged as a result of the blind equalization, control proceeds to step S14. At step S14, the comparison section 63 outputs, to the selector 23, the error selection signal for issuing the instruction to output the signal representing the DD error. As a result, in the selector 23, the DD error calculated by the DD error calculation section 22 is selected in place of the blind error, so that the signal representing the DD error is outputted to the coefficient update section 16.

At step S15, the coefficient update section 16 updates the filter coefficient for the FFE 11 and the filter coefficient for the FBE 14 based on the DD error represented by the signal supplied from the selector 23, to perform the DD error-based equalization.

At step S16, the MSE calculation section 61 calculates the MSE of the DD error calculated by the DD error calculation section 22, and outputs the signal representing the MSE to the averaging section 62.

At step S17, the averaging section 62 calculates, for every predetermined period of time, the average value of the MSE calculated by the MSE calculation section 61, and outputs the signal representing the resulting averaged MSE to the comparison section 63.

At step S18, the comparison section 63 determines whether or not the averaged MSE calculated by the averaging section 62 is equal to or greater than the threshold. If it is determined at step S18 that the averaged MSE is neither equal to nor greater than the threshold, the processes of steps S14 to S18 are repeated, while the DD error-based equalization is allowed to continue.

Meanwhile, if it is determined at step S18 that the averaged MSE is equal to or greater than the threshold, control proceeds to step S19. At step S19, the comparison section 63 outputs, to the selector 23, the error selection signal for issuing the instruction to output the signal representing the blind error. As a result, in the selector 23, the blind error calculated by the blind error calculation section 21 is selected in place of the DD error, so that the signal representing the blind error is outputted to the coefficient update section 16.

At step S20, the coefficient update section 16 updates the filter coefficient for the FFE 11 and the filter coefficient for the FBE 14 based on the blind error represented by the signal supplied from the selector 23, to perform the blind equalization.

At step S21, the MSE calculation section 61 calculates the MSE of the DD error calculated by the DD error calculation section 22, and outputs the signal representing the calculated MSE to the averaging section 62.

At step S22, the averaging section 62 calculates, for every predetermined period of time, the average value of the MSE calculated by the MSE calculation section 61, and outputs the signal representing the resulting averaged MSE to the comparison section 63.

At step S23, the comparison section 63 determines whether or not the averaged MSE calculated by the averaging section 62 is lower than the threshold. If it is determined at step S23 that the averaged MSE is not lower than the threshold, which means that the averaged MSE is equal to or greater than the threshold and that the equalizer 45 is not in a converged state, the processes of steps S19 to S23 are repeated, while the blind equalization is allowed to continue.

Meanwhile, if it is determined at step S23 that the averaged MSE is lower than the threshold, control returns to step S14, and the subsequent processes are repeated. Thus, the error selection signal for issuing the instruction to output the DD error is outputted from the comparison section 63 to the selector 23, so that the DD error-based equalization is performed.

The above-described procedure makes it possible to detect, based on the value of the MSE, that there are so significant variations in the channel that the update of the filter coefficients does not follow the variations.

When it has been detected that the update of the filter coefficients is not following the variations in the channel, the equalization method is adaptively switched from the DD error-based equalization to the blind equalization. This contributes to avoiding the divergence of the operation of the equalizer 45. When the variations in the channel have decreased sufficiently, the equalization method can be switched to the DD error-based equalization, which prevents deterioration in required C/N. Thus, a stable operation of the equalizer 45 is achieved.

In the above-described procedure, after the equalization method is switched from the DD error-based equalization to the blind equalization, the equalization method is switched back to the DD error-based equalization when the MSE of the DD error has become lower than the threshold. However, as is the case with the switch of the equalization method from the blind equalization to the DD error-based equalization immediately after the start of the demodulation, the equalization method may be switched from the blind equalization to the DD error-based equalization, regardless of the MSE of the DD error, when a predetermined period of time has elapsed since the equalization method was switched from the DD error-based equalization to the blind equalization.

Figure 7:
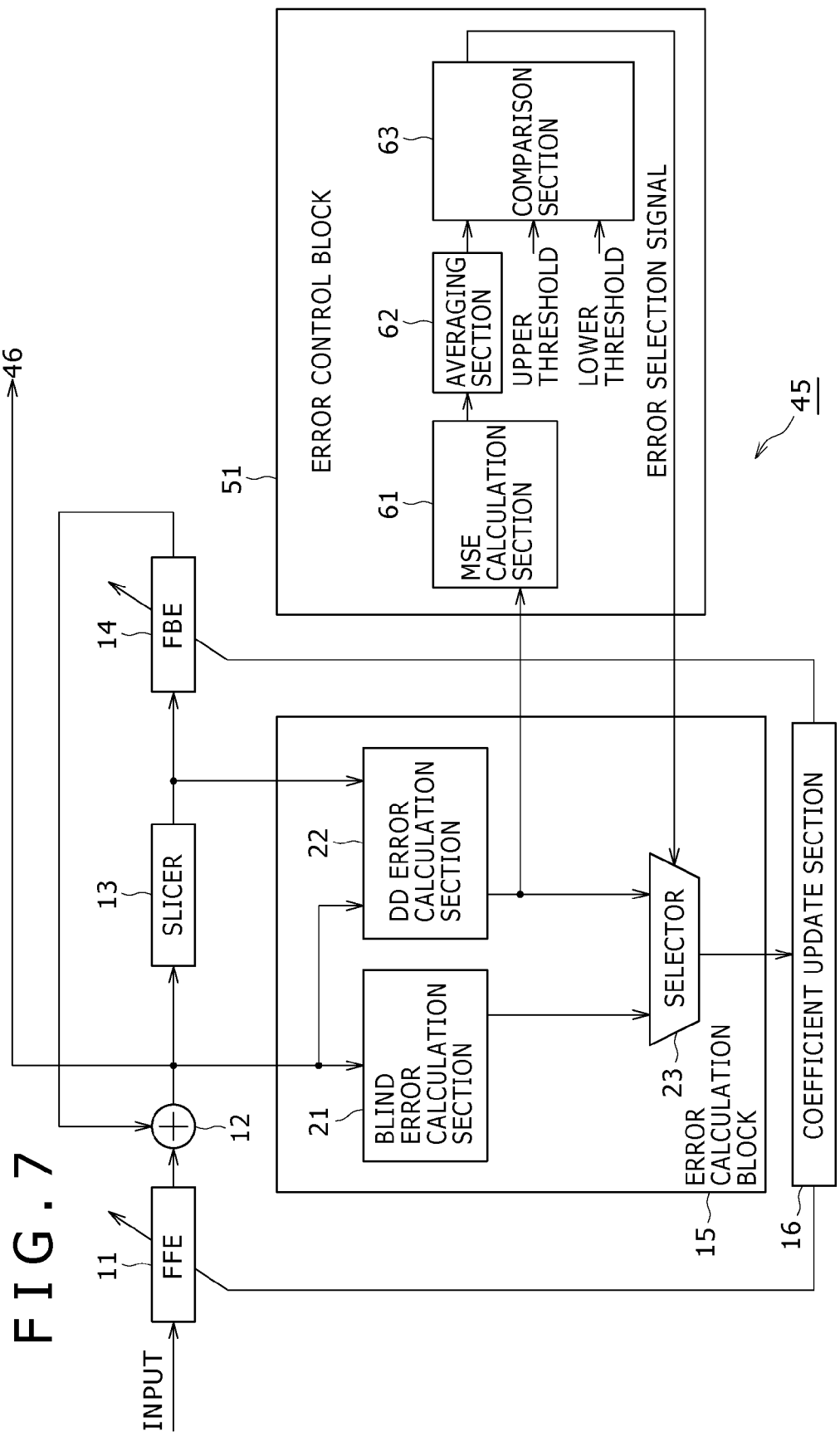
FIG. 7 illustrates another exemplary structure of the equalizer.

FIG. 7 illustrates another exemplary structure of the equalizer 45.

The structure of the equalizer 45 as illustrated in FIG. 7 is identical to the structure of the equalizer 45 as illustrated in FIG. 3 except that two thresholds, an upper threshold and a lower threshold, are given to the comparison section 63. Therefore, redundant explanations are omitted as appropriate.

The comparison section 63 in FIG. 7 compares the averaged MSE calculated by the averaging section 62 with the thresholds, with which the comparison section 63 is supplied beforehand. In the case where the averaged MSE is equal to or greater than the upper threshold, if the current equalization method is the DD error-based equalization, the comparison section 63 outputs to the selector 23 the error selection signal for issuing the instruction to output the signal representing the blind error in place of the signal representing the DD error. As a result, the equalization method is switched from the DD error-based equalization to the blind equalization.

In addition, when the averaged MSE has become lower than the lower threshold, not the upper threshold, after the equalization method was thus switched to the blind equalization, the comparison section 63 outputs to the selector 23 the error selection signal for issuing the instruction to output the signal representing the DD error.

By allowing the error selection signal to have a hysteresis characteristic as described above, it is possible to prevent a flutter, such as chattering, that might occur at the time of the switch of the equalization method, to achieve the stable operation.

Figure 8:
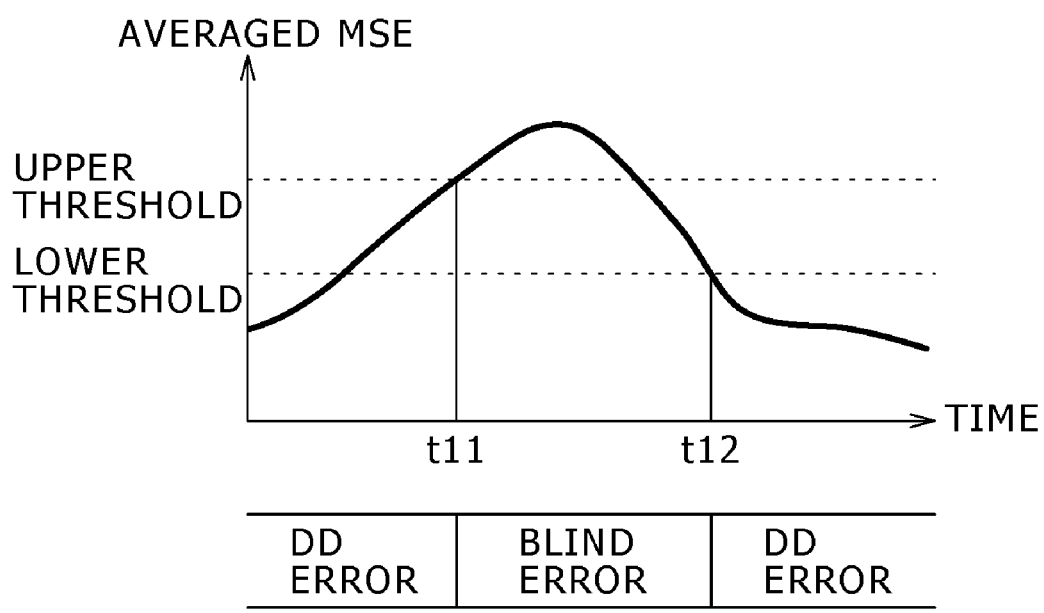
FIG. 8 illustrates another example of the switch in the error selection signal.

FIG. 8 illustrates an example of the switch of the error selection signal.

In the example of FIG. 8, the error selection signal for issuing the instruction to select the DD error continues to be outputted from the comparison section 63 to the selector 23 until time t11, when the averaged MSE reaches and exceeds the upper threshold. From time t11 until time t12, when the averaged MSE becomes lower than the lower threshold, the error selection signal for issuing the instruction to select the blind error continues to be outputted from the comparison section 63 to the selector 23. After time t12, the averaged MSE remains lower than the lower threshold, and accordingly, the error selection signal for issuing the instruction to select the DD error continues to be outputted from the comparison section 63 to the selector 23.

Next, a procedure performed by the equalizer 45 as illustrated in FIG. 7 when updating the filter coefficients will now be described below with reference to a flowchart of FIG. 9.

Figure 9:
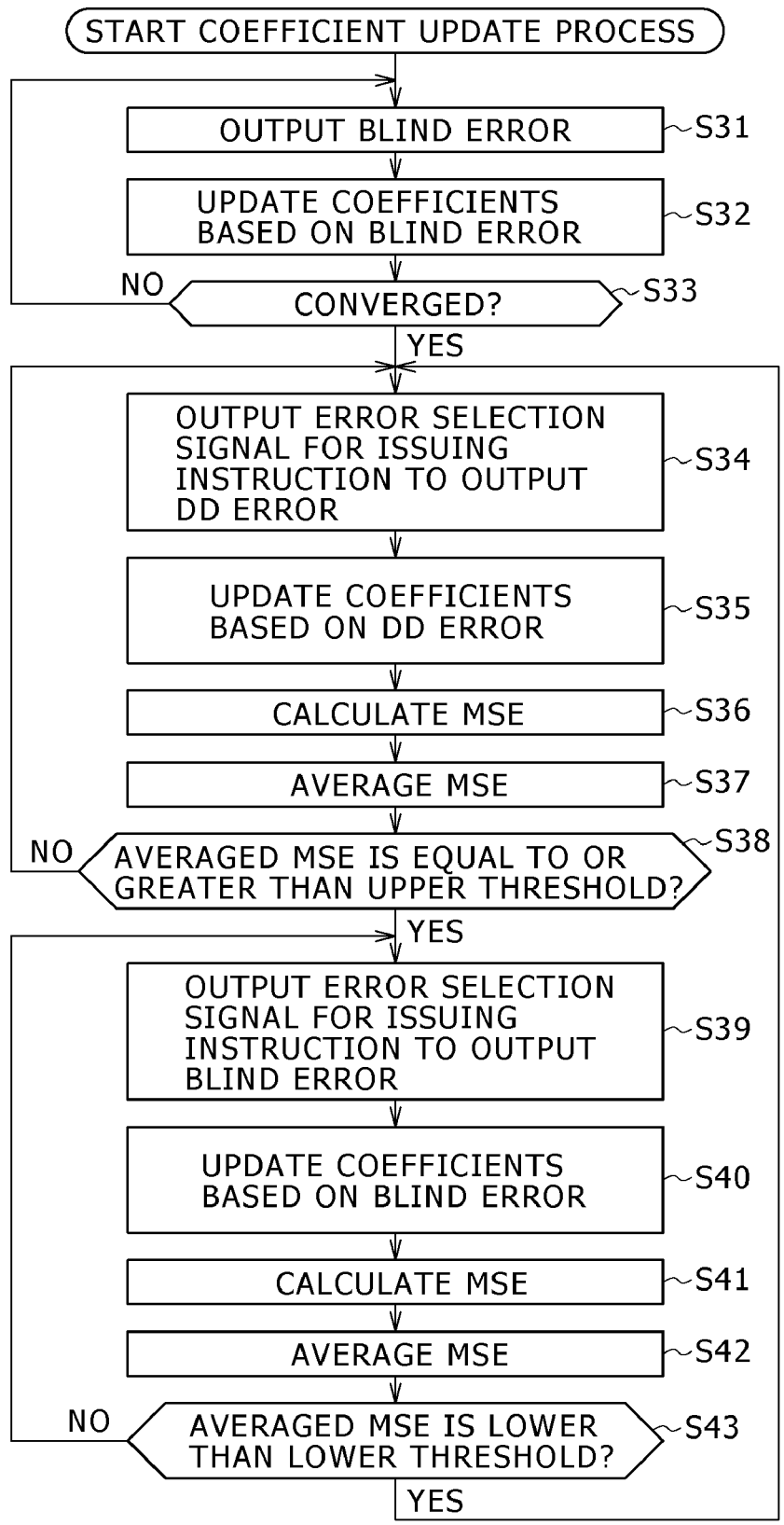
FIG. 9 is a flowchart illustrating another procedure for updating the filter coefficients in the equalizer.

In the equalizer 45 as illustrated in FIG. 7 also, the procedure as described above with reference to the flowchart of FIG. 5 is performed, and in parallel with this procedure, the procedure of FIG. 9 is performed. The procedure of FIG. 9 is identical to the procedure as described above with reference to the flowchart of FIG. 6 except that the MSE of the DD error is compared with the upper threshold and the lower threshold in order to control the switch of the equalization method.

At step S31, the selector 23 outputs the signal representing the blind error supplied from the blind error calculation section 21.

At step S32, the coefficient update section 16 updates the filter coefficient for the FFE 11 and the filter coefficient for the FBE 14 based on the blind error represented by the signal supplied from the selector 23, to perform the blind equalization.

At step S33, the selector 23 determines whether or not the operation of the equalizer 45 has been converged as a result of the blind equalization. If it is determined at step S33 that the operation of the equalizer 45 has not been converged, the processes of steps S31 to S33 are repeated.

Meanwhile, if it is determined at step S33 that the operation of the equalizer 45 has been converged, control proceeds to step S34. At step S34, the comparison section 63 outputs to the selector 23 the error selection signal for issuing the instruction to output the signal representing the DD error. In the selector 23, the DD error calculated by the DD error calculation section 22 is selected in place of the blind error, and the signal representing the DD error is outputted to the coefficient update section 16. The DD error calculated by the DD error calculation section 22 is supplied to the MSE calculation section 61 as well.

At step S35, the coefficient update section 16 updates the filter coefficient for the FFE 11 and the filter coefficient for the FBE 14 based on the DD error represented by the signal supplied from the selector 23, to perform the DD error-based equalization.

At step S36, the MSE calculation section 61 calculates the MSE of the DD error calculated by the DD error calculation section 22, and outputs the signal representing the calculated MSE to the averaging section 62.

At step S37, the averaging section 62 calculates, for every predetermined period of time, the average value of the MSE calculated by the MSE calculation section 61, and outputs the signal representing the resulting averaged MSE to the comparison section 63.

At step S38, the comparison section 63 determines whether or not the averaged MSE calculated by the averaging section 62 is equal to or greater than the upper threshold. If it is determined at step S38 that the averaged MSE is neither equal to nor greater than the upper threshold, the processes of steps S34 to S38 are repeated, while the DD error-based equalization is allowed to continue.

Meanwhile, if it is determined at step S38 that the averaged MSE is equal to or greater than the upper threshold, control proceeds to step S39. At step S39, the comparison section 63 outputs to the selector 23 the error selection signal for issuing the instruction to output the signal representing the blind error. In the selector 23, the blind error calculated by the blind error calculation section 21 is selected in place of the DD error, and the signal representing the blind error is outputted to the coefficient update section 16.

At step S40, the coefficient update section 16 updates the filter coefficient for the FFE 11 and the filter coefficient for the FBE 14 based on the blind error represented by the signal supplied from the selector 23, to perform the blind equalization.

At step S41, the MSE calculation section 61 calculates the MSE of the DD error calculated by the DD error calculation section 22, and outputs the signal representing the calculated MSE to the averaging section 62.

At step S42, the averaging section 62 calculates, for every predetermined period of time, the average value of the MSE calculated by the MSE calculation section 61, and outputs the signal representing the resulting averaged MSE to the comparison section 63.

At step S43, the comparison section 63 determines whether or not the averaged MSE calculated by the averaging section 62 is lower than the lower threshold. If it is determined at step S43 that the averaged MSE is not lower than the lower threshold, the processes of steps S39 to S43 are repeated, while the blind equalization is allowed to continue.

Meanwhile, if it is determined at step S43 that the averaged MSE is lower than the lower threshold, control returns to step S34, and the subsequent processes are repeated. The error selection signal for issuing the instruction to output the DD error is outputted from the comparison section 63 to the selector 23, so that the DD error-based equalization is performed.

The above-described procedure makes it possible to prevent the divergence of the operation of the equalizer 45 while preventing the flutter from occurring at the time of the switch of the equalization method.

Figure 10:
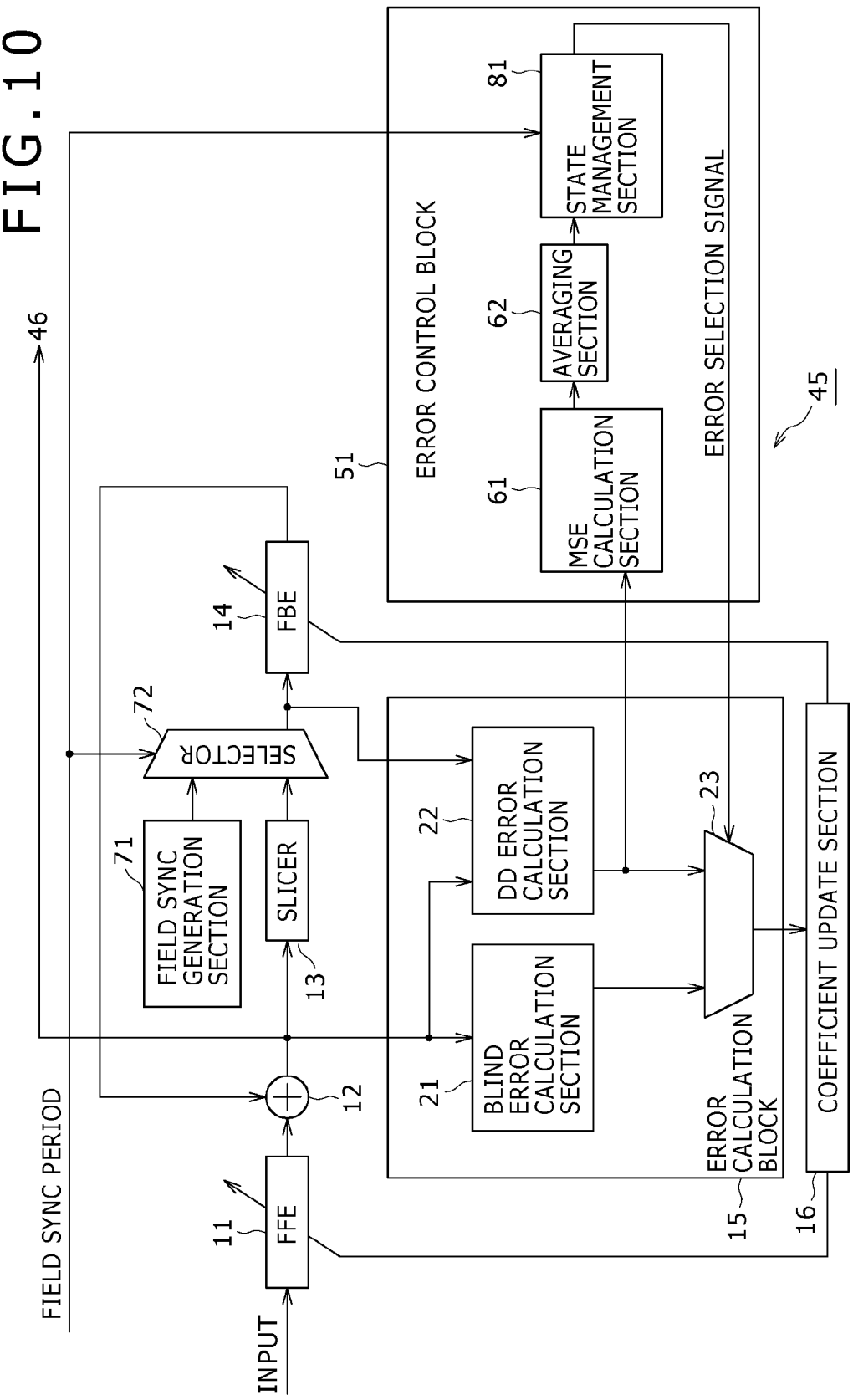
FIG. 10 illustrates yet another exemplary structure of the equalizer.

FIG. 10 illustrates yet another exemplary structure of the equalizer 45.

The structure of the equalizer 45 as illustrated in FIG. 10 is identical to the structure of the equalizer 45 as illustrated in FIG. 3 except that a state management section 81 is provided in the error control block 51 in place of the comparison section 63, and that a field sync generation section 71 and a selector 72 are additionally provided. Therefore, redundant explanations are omitted as appropriate.

Figure 11:
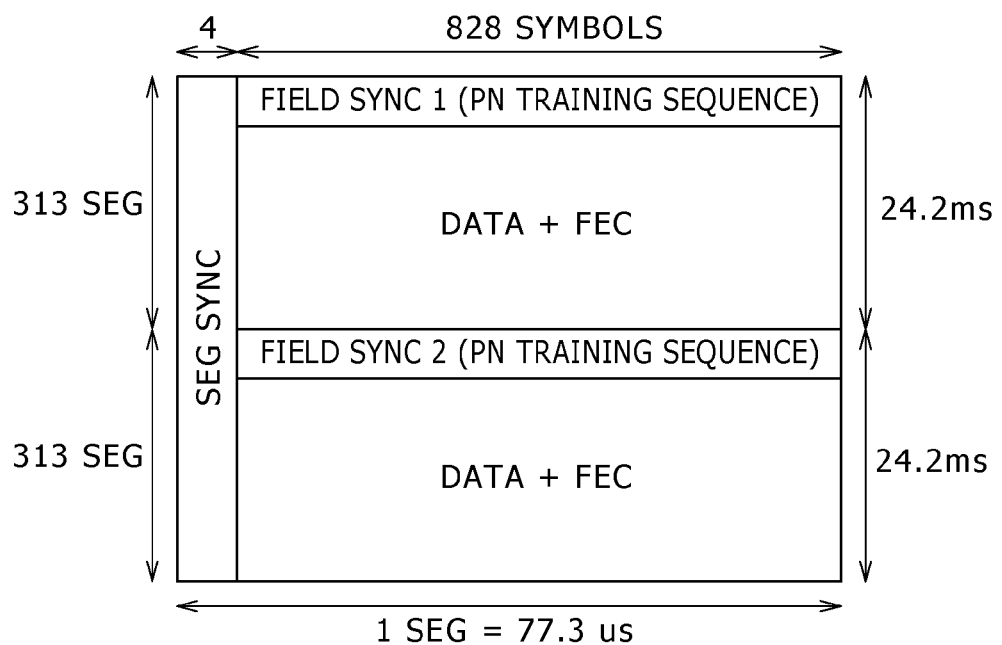
FIG. 11 illustrates an ATSC format.

The equalizer 45 as illustrated in FIG. 10 may be adopted in the case where the reception apparatus 31 as illustrated in FIG. 2 is a device for receiving a broadcast wave in such a format as to include a known signal, such as an advanced television systems committee (ATSC) format. As illustrated in FIG. 11, in the ATSC format, a known signal called "field sync" is assigned to the top of a field.

The field sync is detected by a detector (not shown) based on the signal outputted from the synchronization processor 44. When the field sync has been detected, the detector outputs to the equalizer 45 a field sync period signal that indicates that the current time is in a period when the field sync is being detected. The field sync period signal is inputted to the selector 72 and the state management section 81 in the equalizer 45.

The field sync generation section 71 generates the field sync, which is a known signal, and outputs the generated field sync to the selector 72.

The selector 72 outputs one of the field sync supplied from the field sync generation section 71 and the signal representing the hard decision value supplied from the slicer 13. The signal outputted from the selector 72 is inputted to the FBE 14 and the DD error calculation section 22.

For example, the selector 72 continues to output the field sync as supplied from the field sync generation section 71 during a period in which the selector 72 is supplied with the field sync period signal. Meanwhile, the selector 72 continues to output the signal representing the hard decision value supplied from the slicer 13 during a period in which the selector 72 is not supplied with the field sync period signal.

The FBE 14 subjects either the field sync generated by the field sync generation section 71 and supplied from the selector 72 or the signal representing the hard decision value calculated by the slicer 13 and supplied from the selector 72 to filtering based on the filter coefficient set by the coefficient update section 16. The resulting signal, obtained from the filtering by the FBE 14, is inputted to the adding circuit 12, and used, in combination with the signal outputted from the FFE 11, to generate the post-equalization signal.

The DD error calculation section 22 calculates the error in the post-equalization signal in accordance with the DD method, based on the post-equalization signal supplied from the adding circuit 12 and the signal supplied from the selector 72. A signal representing the DD error calculated by the DD error calculation section 22 is inputted to the selector 23 and the MSE calculation section 61 in the error control block 51. While the selector 72 is supplied with the field sync period signal, the DD error is calculated by the DD error calculation section 22 using the field sync, which is a known signal, and the equalization method is controlled based on the averaged MSE of the calculated DD error.

The state management section 81 manages the state of the operation of the equalizer 45 in accordance with the averaged MSE represented by the signal supplied from the averaging section 62 and whether or not the field sync period signal is present, and outputs to the selector 23 an error selection signal corresponding to the current state.

Figure 12:
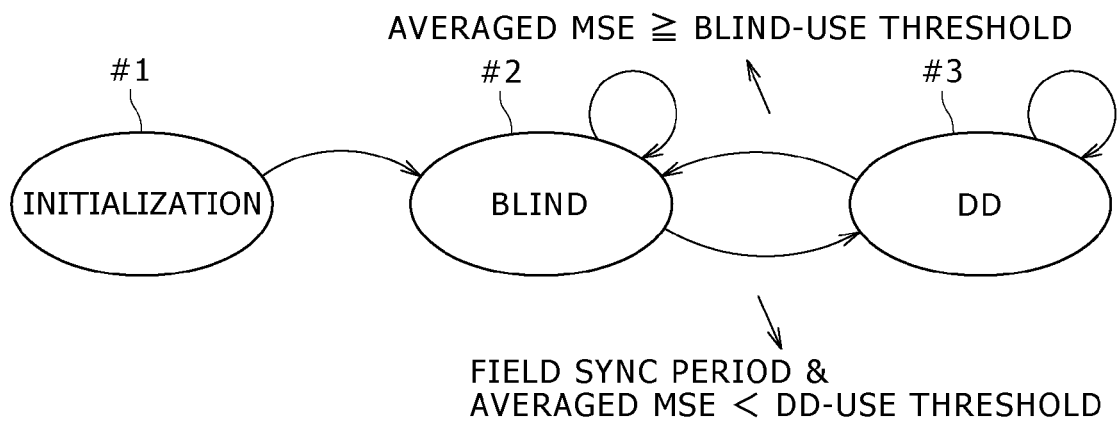
FIG. 12 illustrates an example of state transition.

FIG. 12 illustrates an example of state transition.

State #1 shown on the left represents a state of initialization immediately after the start of the demodulation. After completion of the initialization, the state of the equalizer 45 transitions to state #2.

The state #2 is a state where the blind equalization is performed. The error selection signal for issuing the instruction to output the signal representing the blind error is outputted from the state management section 81 to the selector 23.

If, in the state #2, the field sync period signal is supplied and the averaged MSE is lower than a DD-use threshold, the state of the equalizer 45 transitions to state #3. Even if the averaged MSE is lower than the DD-use threshold, the state of the equalizer 45 does not transition to the state #3 while the field sync period signal is not supplied. As the DD-use threshold, the threshold as described above with reference to FIG. 3 or the lower threshold as described above with reference to FIG. 7 is set, for example.

The state #3 is a state where the DD error-based equalization is performed. The error selection signal for issuing the instruction to output the DD error is outputted from the state management section 81 to the selector 23.

If, in the state #3, the averaged MSE exceeds a blind-use threshold, the state of the equalizer 45 transitions to the state #2. As the blind-use threshold, the threshold as described above with reference to FIG. 3 or the upper threshold as described above with reference to FIG. 7 is set, for example.

The DD-use threshold and the blind-use threshold, with which the averaged MSE is compared, may have either the same value or different values. A reason why different values are used for the DD-use threshold and the blind-use threshold would be as follows.

Since the field sync is a known signal, the MSE of the DD error calculated using the field sync outputted from the selector 72 when the field sync period signal is being inputted is highly precise.

However, when the update of the filter coefficients has become unable to follow the variations in the channel (i.e., when the averaged MSE has reached and exceeded the threshold), it is more desirable to switch the equalization method to the blind equalization instantly than to delay the switch until input of a next field sync period signal.

Thus, when the equalization method is switched from the DD error-based equalization to the blind equalization, the error selection signal is determined based on the MSE of the DD error calculated using the hard decision value calculated by the slicer 13. In contrast, when the equalization method is switched from the blind equalization to the DD error-based equalization, since greater stability is achieved by delaying the switch until the operation is converged to a sufficient degree, the error selection signal is determined based on the MSE of the highly precise DD error calculated using the field sync.

For example, by setting the DD-use threshold at a higher value than the blind-use threshold, it is possible to allow the switch of the equalization method from the DD error-based equalization to the blind equalization to be performed quickly, and allow the switch of the equalization method from the blind equalization to the DD error-based equalization to be performed at a timing that ensures greater stability.

Here, procedures performed by the equalizer 45 with the structure as illustrated in FIG. 10 will now be described below.

First, an equalization process performed by the equalizer 45 will be described with reference to a flowchart of FIG. 13.

Figure 5:
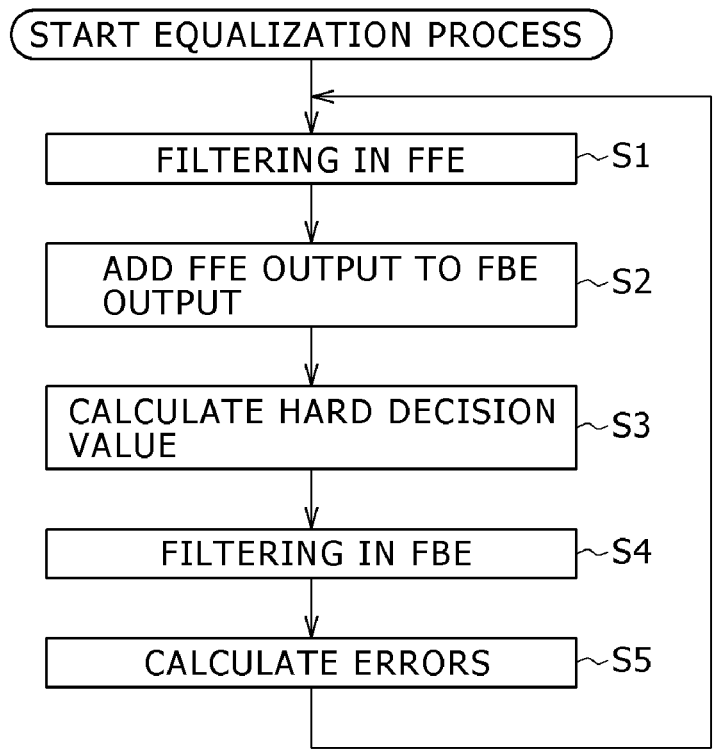
FIG. 5 is a flowchart illustrating an equalization process performed by the equalizer.
Figure 13:
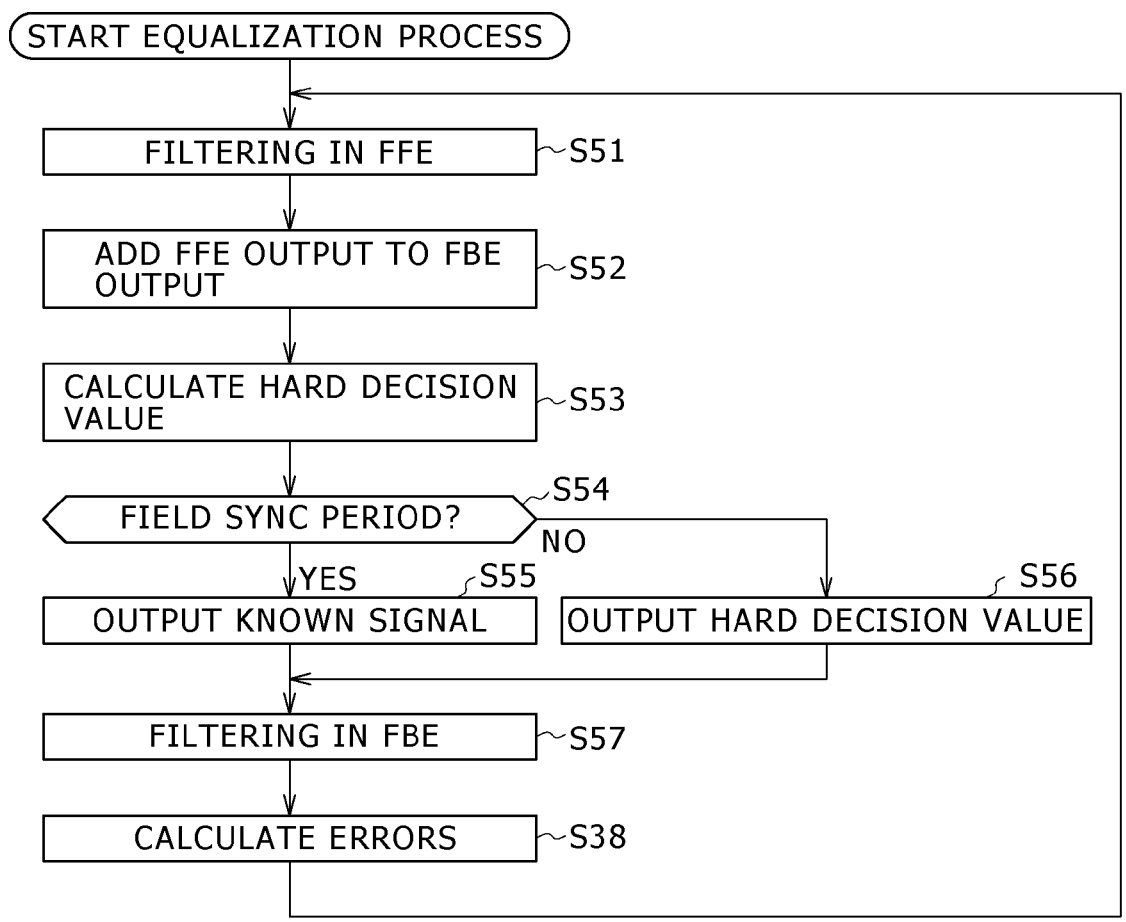
FIG. 13 is a flowchart illustrating another equalization process performed by the equalizer.

A procedure as illustrated in FIG. 13 is identical to the procedure of FIG. 5 except that different signals are used to calculate the DD error depending on whether or not the field sync period signal is being inputted.

At step S51, the FFE 11 subjects the input signal to the filtering based on the filter coefficient set by the coefficient update section 16. The resulting signal, obtained from the filtering by the FFE 11, is inputted to the adding circuit 12.

At step S52, the adding circuit 12 adds the signal supplied from the FFE 11 to the signal supplied from the FBE 14, and outputs the resulting post-equalization signal. The post-equalization signal outputted from the adding circuit 12 is inputted to the slicer 13, the blind error calculation section 21, and the DD error calculation section 22.

At step S53, the slicer 13 calculates the hard decision value for the post-equalization signal supplied from the adding circuit 12. The signal representing the hard decision value calculated by the slicer 13 is inputted to the selector 72.

At step S54, the selector 72 determines whether or not the current time is in the field sync period, based on the state of input of the field sync period signal.

If it is determined at step S54 that the current time is in the field sync period, control proceeds to step S55. At step S55, the selector 72 outputs the field sync generated by the field sync generation section 71. The field sync outputted from the selector 72 is inputted to the FBE 14 and the DD error calculation section 22.

Meanwhile, if it is determined at step S54 that the current time is not in the field sync period, control proceeds to step S56. At step S56, the selector 72 outputs the signal representing the hard decision value as calculated by the slicer 13. The signal representing the hard decision value outputted from the selector 72 is inputted to the FBE 14 and the DD error calculation section 22.

At step S57, the FBE 14 subjects the field sync or the hard decision value as supplied from the selector 72 to the filtering. The resulting signal, obtained from the filtering by the FBE 14, is inputted to the adding circuit 12, and used, in combination with the signal outputted from the FFE 11, to generate the post-equalization signal.

At step S58, the error calculation block 15 calculates the blind error in the blind error calculation section 21, and calculates the DD error in the DD error calculation section 22. Of the field sync generated by the field sync generation section 71 and the signal representing the hard decision value obtained by the slicer 13, the signal selected by the selector 72 is used for the calculation of the DD error. Thereafter, control returns to step S51, and the above-described processes are repeated.

Figure 14:
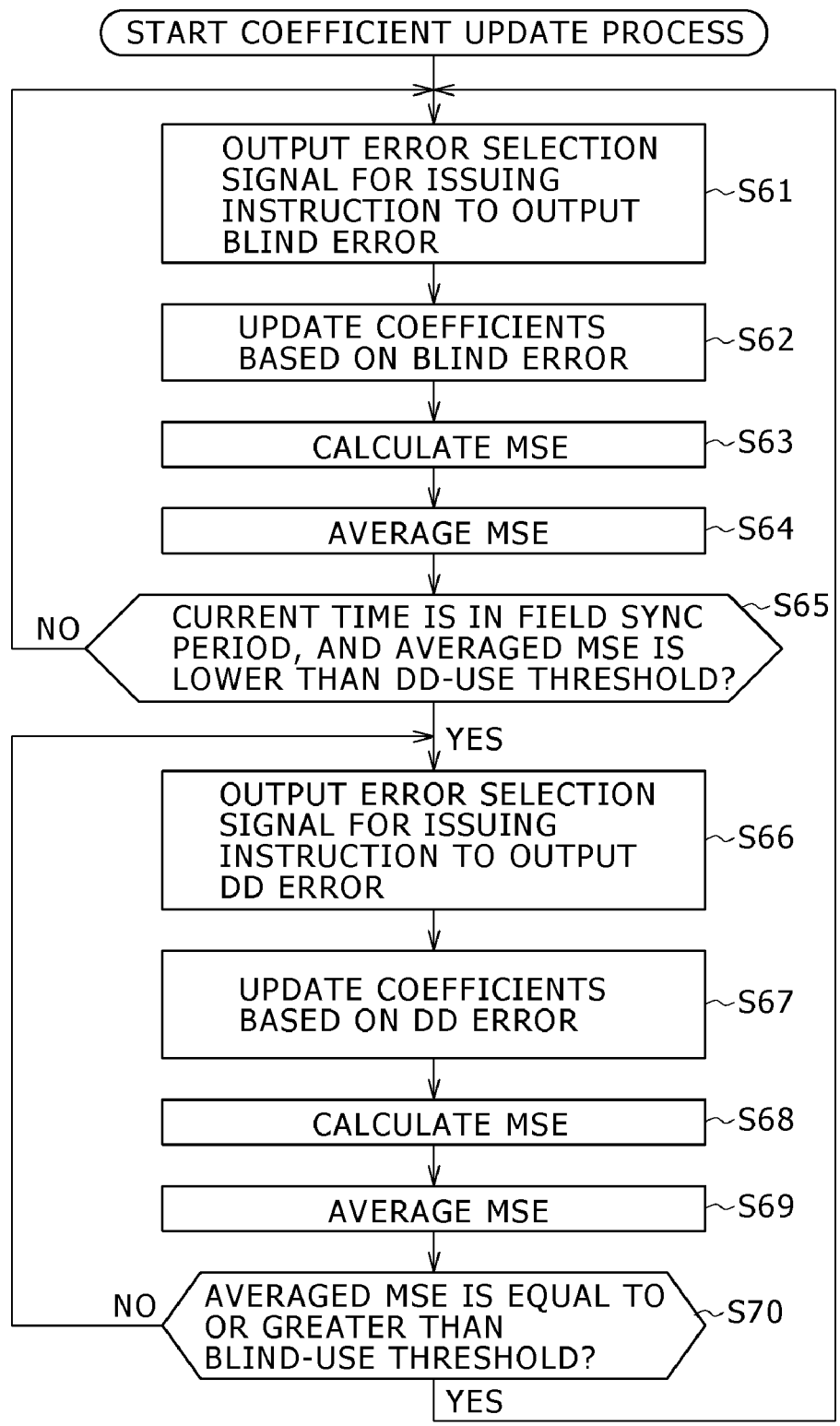
FIG. 14 is a flowchart illustrating yet another procedure for updating the filter coefficients in the equalizer.

Next, a procedure performed by the equalizer 45 as illustrated in FIG. 10 when updating the filter coefficients will now be described below with reference to a flowchart of FIG. 14. This procedure is started when the initialization has been completed so that the equalizer 45 is in the state #2 as illustrated in FIG. 12.

At step S61, the state management section 81 outputs, to the selector 23, the error selection signal for issuing the instruction to output the signal representing the blind error. In the selector 23, the blind error calculated by the blind error calculation section 21 is selected, and the signal representing the blind error is outputted to the coefficient update section 16.

At step S62, the coefficient update section 16 updates the filter coefficient for the FFE 11 and the filter coefficient for the FBE 14 based on the blind error represented by the signal supplied from the selector 23, to perform the blind equalization.

At step S63, the MSE calculation section 61 calculates the MSE of the DD error calculated by the DD error calculation section 22, and outputs the signal representing the calculated MSE to the averaging section 62.

At step S64, the averaging section 62 calculates, for every predetermined period of time, the average value of the MSE calculated by the MSE calculation section 61, and outputs the signal representing the resulting averaged MSE to the state management section 81.

At step S65, the state management section 81 determines whether or not the current time is in the field sync period and the averaged MSE calculated by the averaging section 62 is lower than the DD-use threshold. If it is determined at step S65 that the current time is not in the field sync period or the averaged MSE is not lower than the DD-use threshold, the processes of steps S61 to S65 are repeated, while the blind equalization is allowed to continue.

Meanwhile, if it is determined at step S65 that the current time is in the field sync period and the averaged MSE is lower than the DD-use threshold, control proceeds to step S66. At step S66, the state management section 81 outputs to the selector 23 the error selection signal for issuing the instruction to output the signal representing the DD error. In the selector 23, the DD error calculated by the DD error calculation section 22 is selected in place of the blind error, and the signal representing the DD error is outputted to the coefficient update section 16.

At step S67, the coefficient update section 16 updates the filter coefficient for the FFE 11 and the filter coefficient for the FBE 14 based on the DD error represented by the signal supplied from the selector 23, to perform the DD error-based equalization.

At step S68, the MSE calculation section 61 calculates the MSE of the DD error calculated by the DD error calculation section 22, and outputs the signal representing the calculated MSE to the averaging section 62.

At step S69, the averaging section 62 calculates, for every predetermined period of time, the average value of the MSE calculated by the MSE calculation section 61, and outputs the signal representing the resulting averaged MSE to the state management section 81.

At step S70, the state management section 81 determines whether or not the averaged MSE is equal to or greater than the blind-use threshold. If it is determined at step S70 that the averaged MSE is neither equal to nor greater than the blind-use threshold, the processes of steps S66 to S70 are repeated, while the DD error-based equalization is allowed to continue.

Meanwhile, if it is determined at step S70 that the averaged MSE is equal to or greater than the blind-use threshold, control returns to step S61.

The above-described procedure also makes it possible to stabilize the operation of the equalizer 45 even when there are variations in the channel.

In addition, the switch of the equalization method from the DD error-based equalization to the blind equalization can be performed quickly, while the switch of the equalization method from the blind equalization to the DD error-based equalization can be performed at a timing that ensures greater stability.

In the above-described embodiment, it has been assumed that the equalization method is switched from the blind equalization to the DD error-based equalization when the predetermined period of time has elapsed since the start of the demodulation. However, it may be so arranged that the calculation of the MSE of the DD error is started upon start of the demodulation, and that the equalization method is switched to the DD error-based equalization when the averaged MSE has become lower than a threshold.

The above-described series of processes may be implemented either in hardware or in software. In the case where the series of processes is implemented in software, a program that forms the software is installed from a program storage medium into a computer having dedicated hardware configuration or a general-purpose personal computer that, when various programs are installed thereon, becomes capable of achieving various functions, for example.

Figure 15:
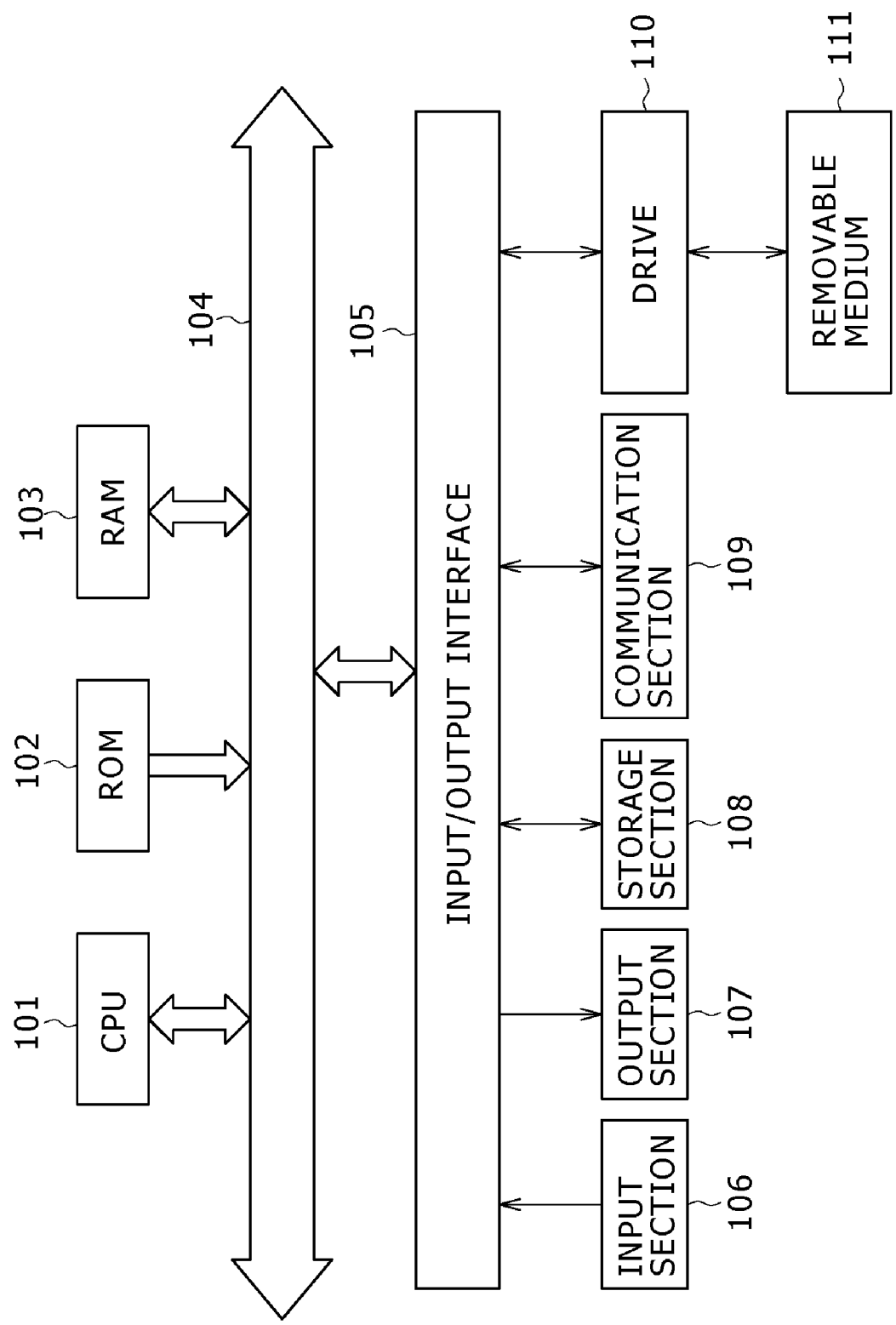
FIG. 15 is a block diagram illustrating an exemplary hardware structure of a computer.

FIG. 15 is a block diagram illustrating an exemplary hardware structure of a computer that performs the above-described series of processes in accordance with the program.

A central processing unit (CPU) 101, a read-only memory (ROM) 102, and a random access memory (RAM) 103 are connected to one another via a bus 104.

An input/output interface 105 is also connected to the bus 104. To the input/output interface 105 are connected: an input section 106, which is formed by a keyboard, a mouse, a microphone, and so on; an output section 107, which is formed by a display, a loudspeaker, and so on; a storage section 108, which is formed by a hard disk, a nonvolatile memory, and so on; a communication section 109, which is formed by a network interface and so on; and a drive 110, which is used to drive a removable medium 111, such as an optical disc, a semiconductor memory, or the like.

In the computer with the above-described structure, the CPU 101 loads the program stored in the storage section 108, for example, into the RAM 103 via the input/output interface 105 and the bus 104, and executes the loaded program to perform the above-described series of processes.

The program executed by the CPU 101 is stored in the removable medium 111, for example, or provided via a wired or wireless transmission medium, such as a local area network, the Internet, or digital broadcasting, and then installed into the storage section 108.

Note that the program executed by the computer may be either a program that allows the processes to be performed chronologically in an order as described in the present specification, or a program that allows some of the processes to be performed in parallel or performed at a time when they need be performed, such as when a call has been issued.

The present invention is not limited to the above-described embodiment. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-112969, filed in the Japan Patent Office on Apr. 23, 2008, the entire content of which is hereby incorporated by reference.

What is claimed is:

1. A demodulation circuit, comprising:
a first error calculation section configured to calculate a first error in a post-equalization signal in accordance with a blind method;
a second error calculation section configured to calculate a second error in the post-equalization signal in accordance with a decision-directed method;
a update section configured to update a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal;
a control section configured to, in a case where said update section is performing the update of the filter coefficients for the first and second filters based on the second error, control the update of the filter coefficients for the first and second filters based on the first error, when an averaged mean square error of the second error has exceeded a first threshold; and
a generation section configured to generate the post-equalization signal based on the first and second signals.

2. The demodulation circuit according to claim 1, wherein, after controlling the update of the filter coefficients for the first and second filters based on the first error, said control section further controls the update of the filter coefficients for the first and second filters based on the second error, when the averaged mean square error of the second error has become lower than the first threshold.

3. The demodulation circuit according to claim 1, wherein, after controlling the update of the filter coefficients for the first and second filters based on the first error, said control section further controls the update of the filter coefficients for the first and second filters based on the second error, when the averaged mean square error of the second error has become lower than a second threshold that is lower than the first threshold.

4. The demodulation circuit according to claim 1, wherein, when a known signal is received, said second error calculation section further calculates the second error based on the post-equalization signal and the known signal, and
after controlling the update of the filter coefficients for the first and second filters based on the first error, said control section controls the update of the filter coefficients for the first and second filters based on the second error, when the averaged mean square error of the second error calculated by said second error calculation section based on the post-equalization signal and the known signal has become lower than a second threshold.

5. A demodulation method, comprising the steps of:
calculating a first error in a post-equalization signal in accordance with a blind method;
calculating a second error in the post-equalization signal in accordance with a decision-directed method;
updating a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal;
in a case where the update of the filter coefficients for the first and second filters is being performed based on the second error, updating the filter coefficients for the first and second filters based on the first error, when an averaged mean square error of the second error has exceeded a threshold; and
generating the post-equalization signal based on the first and second signals.

6. A computer-readable tangible and non-transitory medium having information for recorded thereon, wherein the information, when read by the computer, causes the computer to perform the following:
calculating a first error in a post-equalization signal in accordance with a blind method;
calculating a second error in the post-equalization signal in accordance with a decision-directed method;
updating a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal;
in a case where the update of the filter coefficients for the first and second filters is being performed based on the second error, updating the filter coefficients for the first and second filters based on the first error, when an averaged mean square error of the second error has exceeded a threshold; and
generating the post-equalization signal based on the first and second signals.

7. A reception apparatus, comprising:
first error calculation means for calculating a first error in a post-equalization signal in accordance with a blind method;
second error calculation means for calculating a second error in the post-equalization signal in accordance with a decision-directed method;
update means for updating a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal; control means for, in a case where said update means is performing the update of the filter coefficients for the first and second filters based on the second error, controlling the update of the filter coefficients for the first and second filters based on the first error, when an averaged mean square error of the second error has exceeded a threshold; and
generation means for generating the post-equalization signal based on the first and second signals.

8. A demodulation circuit, comprising:

first error calculation means for calculating a first error in a post-equalization signal in accordance with a blind method;

second error calculation means for calculating a second error in the post-equalization signal in accordance with a decision-directed method;

update means for updating a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal;

control means for, in a case where said update means is performing the update of the filter coefficients for the first and second filters based on the second error, controlling the update of the filter coefficients for the first and second filters based on the first error, when an averaged mean square error of the second error has exceeded a first threshold; and generation means for generating the post-equalization signal based on the first and second signals.

9. A reception apparatus, comprising:

a first error calculation section configured to calculate a first error in a post-equalization signal in accordance with a blind method;

a second error calculation section configured to calculate a second error in the post-equalization signal in accordance with a decision-directed method;

an update section configured to update a filter coefficient for a first filter and a filter coefficient for a second filter based on the first or second error, the first filter subjecting an input signal to filtering to generate a first signal that is used to generate the post-equalization signal, the second filter subjecting a signal representing a hard decision value for the post-equalization signal to filtering to generate a second signal that is used to generate the post-equalization signal;

a control section configured to, in a case where said update section is performing the update of the filter coefficients for the first and second filters based on the second error, control the update of the filter coefficients for the first and second filters based on the first error, when an averaged mean square error of the second error has exceeded a threshold; and a generation section configured to generate the post-equalization signal based on the first and second signals.

* * * * *